United States Patent
Horng et al.

(10) Patent No.: US 6,737,769 B2
(45) Date of Patent: May 18, 2004

(54) EASY-TO-START-STRUCTURE OF A DC BRUSHLESS MOTOR

(75) Inventors: Alex Horng, Kaohsiung (TW); Ching-Shen Hong, Kaohsiung (TW); Tso-Kuo Yin, Kaohsiung Hsien (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 1 day.

(21) Appl. No.: 09/964,640

(22) Filed: Sep. 28, 2001

(65) Prior Publication Data

US 2003/0062798 A1 Apr. 3, 2003

(51) Int. Cl.⁷ ................................................ H02K 7/00
(52) U.S. Cl. ...................... 310/68 R; 310/254; 310/265
(58) Field of Search .............................. 310/68 R, 254, 310/264, 265

(56) References Cited

U.S. PATENT DOCUMENTS

| | | | | |
|---|---|---|---|---|
| 4,728,833 A | * | 3/1988 | Shiraki et al. ............ 310/68 R |
| 4,891,537 A | * | 1/1990 | Shiraki et al. ............ 310/68 B |
| 5,019,737 A | * | 5/1991 | Bruno .......................... 310/89 |
| 6,342,742 B1 | * | 1/2002 | Kim ............................. 310/81 |
| 6,353,275 B1 | * | 3/2002 | Nishiyama et al. .... 310/156.53 |

* cited by examiner

Primary Examiner—Burton S. Mullins
Assistant Examiner—Nguyen Hanh
(74) Attorney, Agent, or Firm—Bacon & Thomas, PLLC (57) ABSTRACT

An easy-to-start structure for a D.C. brushless motor comprises a base including a through-hole. Plural windings and an IC control member are mounted to the base. At least one magnetically attractive positioning member is mounted to the base and located between two windings that are adjacent to each other. A rotor comprises a shaft rotatably held by a support section in the through-hole and a permanent ring magnet mounted to the shaft, the permanent ring magnet having north and south poles, each of the south pole and the north pole having a strong magnetic area. The positioning member attracts and thus retains one of the strong magnetic areas of the permanent ring magnet in a position proximal to the positioning member when the rotor stops. Thus, the rotor rests in a pre-determined position not located in a dead corner for restarting.

14 Claims, 7 Drawing Sheets

EASY-TO-START-STRUCTURE OF A DC BRUSHLESS MOTOR

BACKGROUND OF THE INVENTION

1. Field of the Invention

The present invention relates to an easy-to-start structure of a D.C. brushless motor in which the rotor of the motor may rest in an easy-to-start position when the rotor stops rotating.

2. Description of the Related Art

Figure 9:
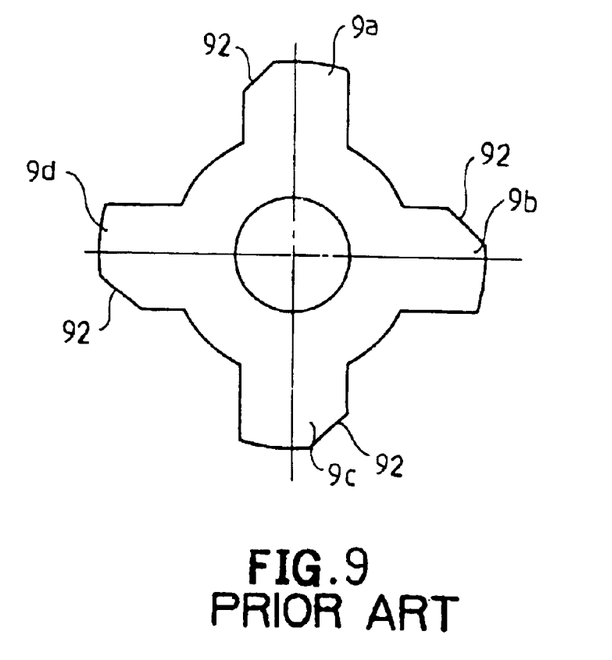
FIG. 9 is a plan view of a stator core of a conventional D.C. brushless motor structure disclosed in U.S. Pat. No. 4,899,075.

FIG. 9 of the drawings, which corresponds to FIG. 2b of U.S. Pat. No. 4,899,075 to Hasebe issued on Feb. 6, 1990, illustrates a conventional stator structure of a bi-directional brushless D.C. motor comprising a pair of stator cores each having a plurality of salient poles 9a~9d each of which is shaped to have a notched portion 92 in one of opposite corners, in a direction of rotation of the rotor, and oriented so as to be next to the unnotched corner of the stator pole adjacent thereto.

Figure 10:
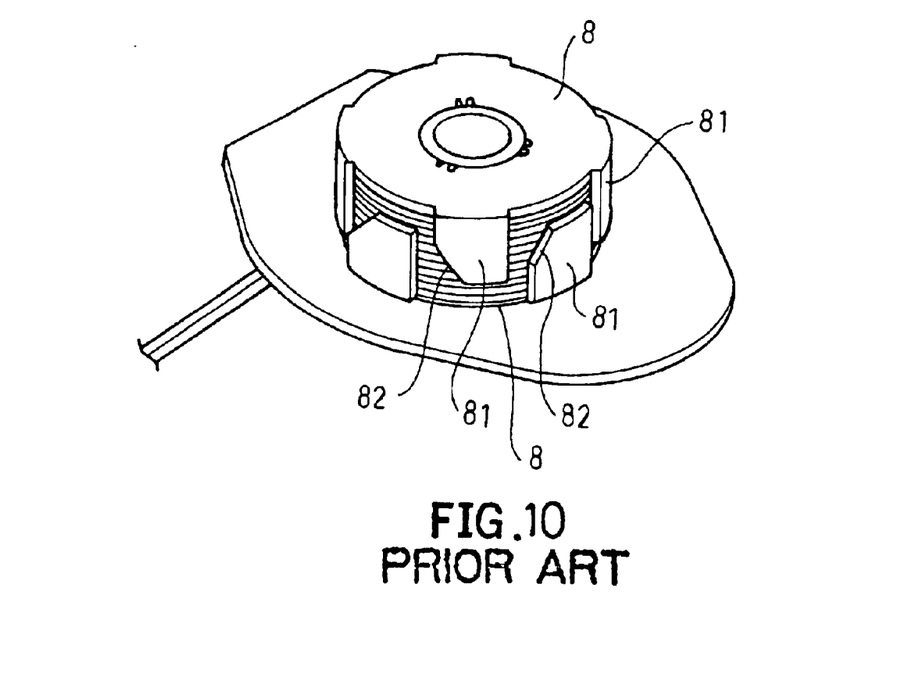
FIG. 10 is a perspective view of another conventional D.C. brushless motor structure disclosed in Taiwan Utility Model Application No. 81217854.

FIG. 10 of the drawings illustrates another conventional stator structure of a D.C. brushless motor structure disclosed in Taiwan Utility Model Application No. 81217854 published on Nov. 1, 1993 and entitled IMPROVED STATOR YOKE FOR A STATOR OF A HEAT-DISSIPATING FAN MOTOR. Each of an upper stator yoke 8 and a lower stator yoke 8 comprises plural poles 81 on a peripheral edge thereof, each pole 81 having a notched portion 82 in a side thereof.

The notched portions 92 and 82 in these conventional D.C. brushless motor structures are designed to create an uneven magnetic force associated with the permanent magnet, thereby preventing the rotor from stopping in a dead corner for starting and thereby allowing the rotor to be restarted.

SUMMARY OF THE INVENTION

An object of the present invention is to provide an easy-to-start structure of a D.C. brushless motor that prevents the rotor of the motor from stopping in a dead corner for starting and that allows the rotor to be restarted easily.

An easy-to-start structure for a D.C. brushless motor in accordance with the present invention comprises a base including a through-hole having an end in which a support section is provided. Plural windings and an IC control member are mounted to the base, the IC control member being located between two windings that are adjacent to each other. At least one magnetically attractive positioning member is mounted to the base and located in a space defined between two windings that are adjacent to each other. A rotor comprises a shaft rotatably held by the support section and a permanent ring magnet mounted to the shaft, the permanent ring magnet having north and south poles, each of the south pole and the north pole having a strong magnetic area. The positioning member attracts, directly aligns with, and thus retains one of the strong magnetic areas of the permanent mg magnet in a position proximal to the positioning member when the rotor stops. Thus, the rotor rests in a predetermined position not located in a dead corner for restarting.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 1:
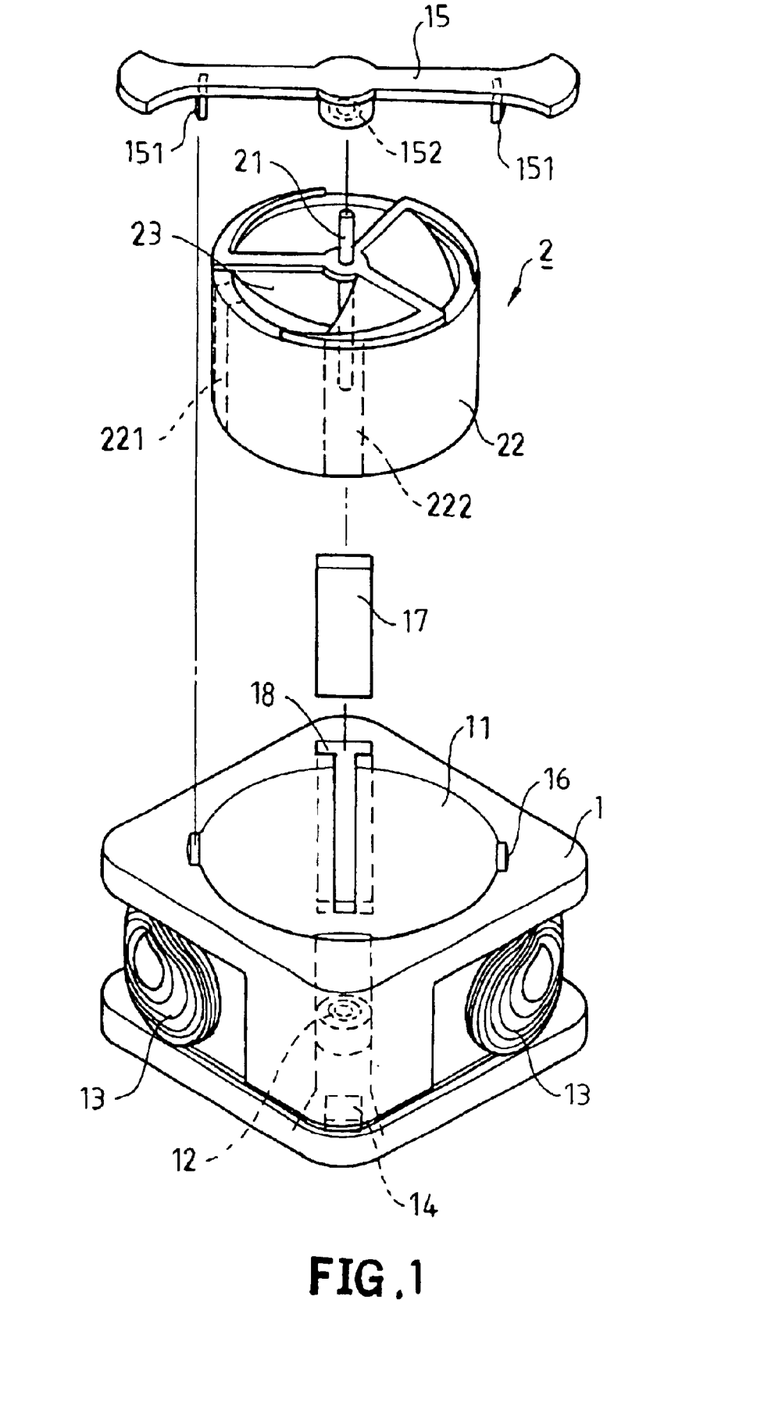
FIG. 1 is an exploded perspective view of a first embodiment of a D.C. brushless motor structure in accordance with the present invention.

Referring to FIG. 1, a first embodiment of a D.C. brushless motor structure in accordance with the present invention generally comprises a base 1 and a rotor 2.

The base 1 is a casing having a through-hole 11. A support section 12 is provided in an end of the through-hole 11. The support section 12 may be a bearing or shaft sleeve for rotatably holding a shaft 21 of the rotor 2. Even-numbered windings 13 are securely mounted to an outer wall of the base 1 or an inner wall defining the through-hole 11. An IC control means 14 comprising a conventional drive circuit and a Hall element is mounted on the base 1. The IC control means 14 is located between two adjacent windings 13 and electrically connected to the windings 13. In order to allow stable rotation of the rotor 2, a support element 15 is mounted on the other end of the base 1. The support element 15 may be directly fixed on the base 1. As shown in FIG. 1, the support element 15 comprises engaging pieces 151 that are respectively engaged in positioning holes 16 in the base 1. The support element 15 comprises a support section 152 in the form of a bearing or shaft sleeve. Of more importance, at least one positioning member 17 made of magnetically attractive metal is mounted to the base 1. The positioning member 17 can be of any shape, such as a cylinder, parallelepiped, or plate. As illustrated in FIG. 1, the positioning member 17 is positioned in a complimentary positioning hole or groove 18 in the base 1, the positioning groove 18 being located between two windings 13.

The shaft 21 of the rotor 2 is rotatably held by the support section 12 of the base 1 and the support section 152 of the support element 15. A permanent ring magnet 22 is mounted to the shaft 21 of the rotor 2 and comprises north and south poles. The permanent ring magnet 22 comprises at least two transition areas 221, each transition area 221 having a first end contiguous to a north pole and a second end contiguous to a south pole. Each of the north and south poles has a strong magnetic area 222 located in an intermediate position between two transition areas 221. In addition, the rotor 2 may have blades 23 provided thereon so as to drive air to flow when the rotor 2 turns, thereby forming a heat-dissipating fan.

Figure 2:
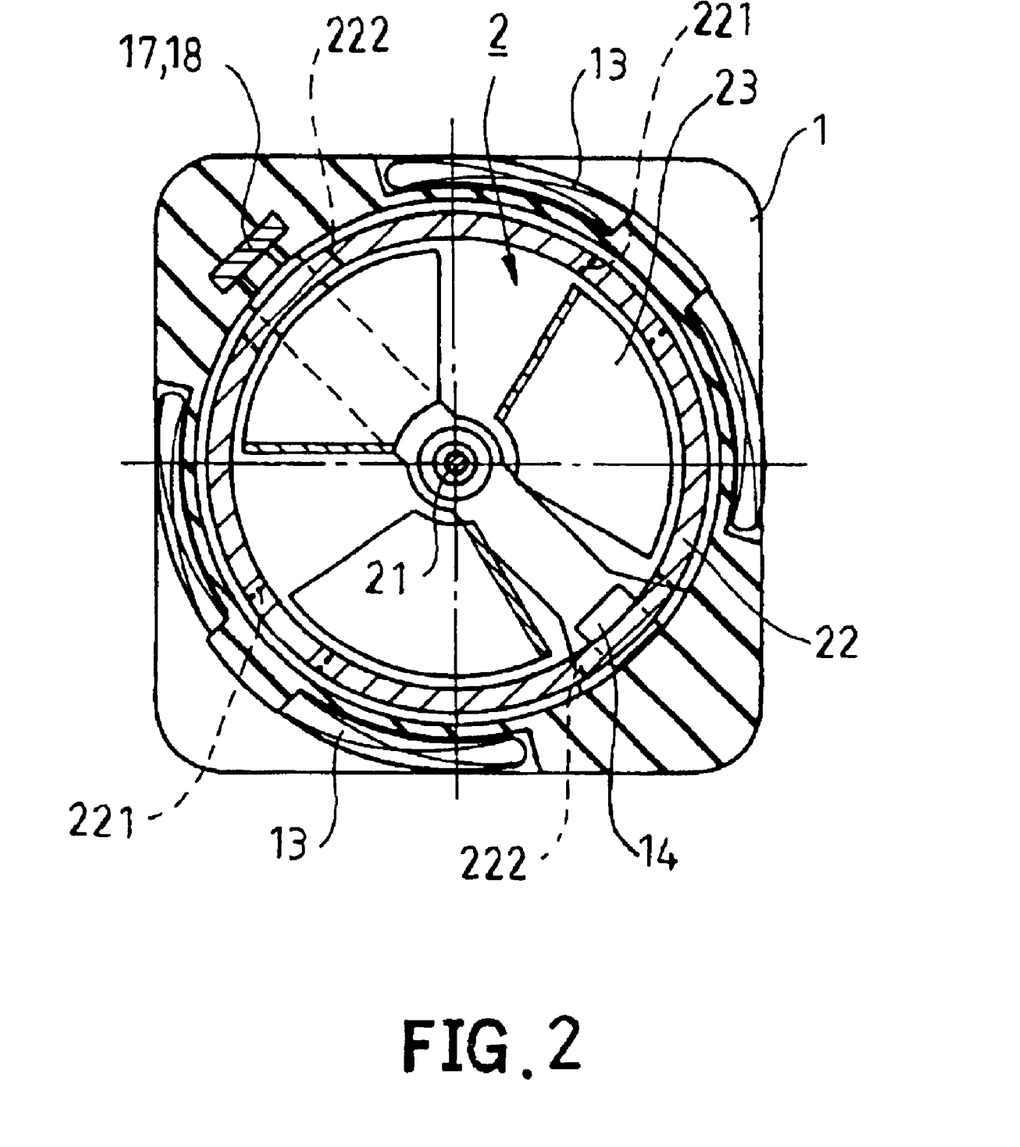
FIG. 2 is a sectional view of the D.C. brushless motor structure in FIG. 1.

As illustrated in FIG. 2, the base 1 has even-numbered windings 13 mounted to the outer wall thereof. The rotor 2 is received in the through-hole 11 of the base 1. Two ends of the shaft 21 of the rotor 2 are respectively, rotatably received in the support section 12 of the base 1 and the support section 152 of the support element 15. And the permanent ring magnet 22 of the rotor 2 is located in a position relative to the windings 13 on the base 1. The IC control means 14 detects a change in the polarities of the permanent ring magnet 22 of the rotor 2 and sends a signal to alter the polarities of the magnetic fields created by the windings 13, thereby driving the permanent ring magnet 22 to turn by repulsive forces. When the rotor 2 stops, the closest one of the strong magnetic areas 222 of the north and south poles of the permanent ring magnet 23 is attracted and thus retained in place by the magnetically attractive positioning member 17 on the base 1. Thus, the strong magnetic area 222 of each magnetic pole of the permanent ring magnet 23 is located away from a respective winding 13 on the base 1. Namely, the transition areas 221 of the permanent ring magnet 23 are not proximal to and thus do not face the IC control means 14. As a result, when the rotor 2 is to be restarted, the IC control means 14 will surely be able to detect the polarities of the permanent ring magnet 23 and thus reliably restart the motor easily.

Figure 3:
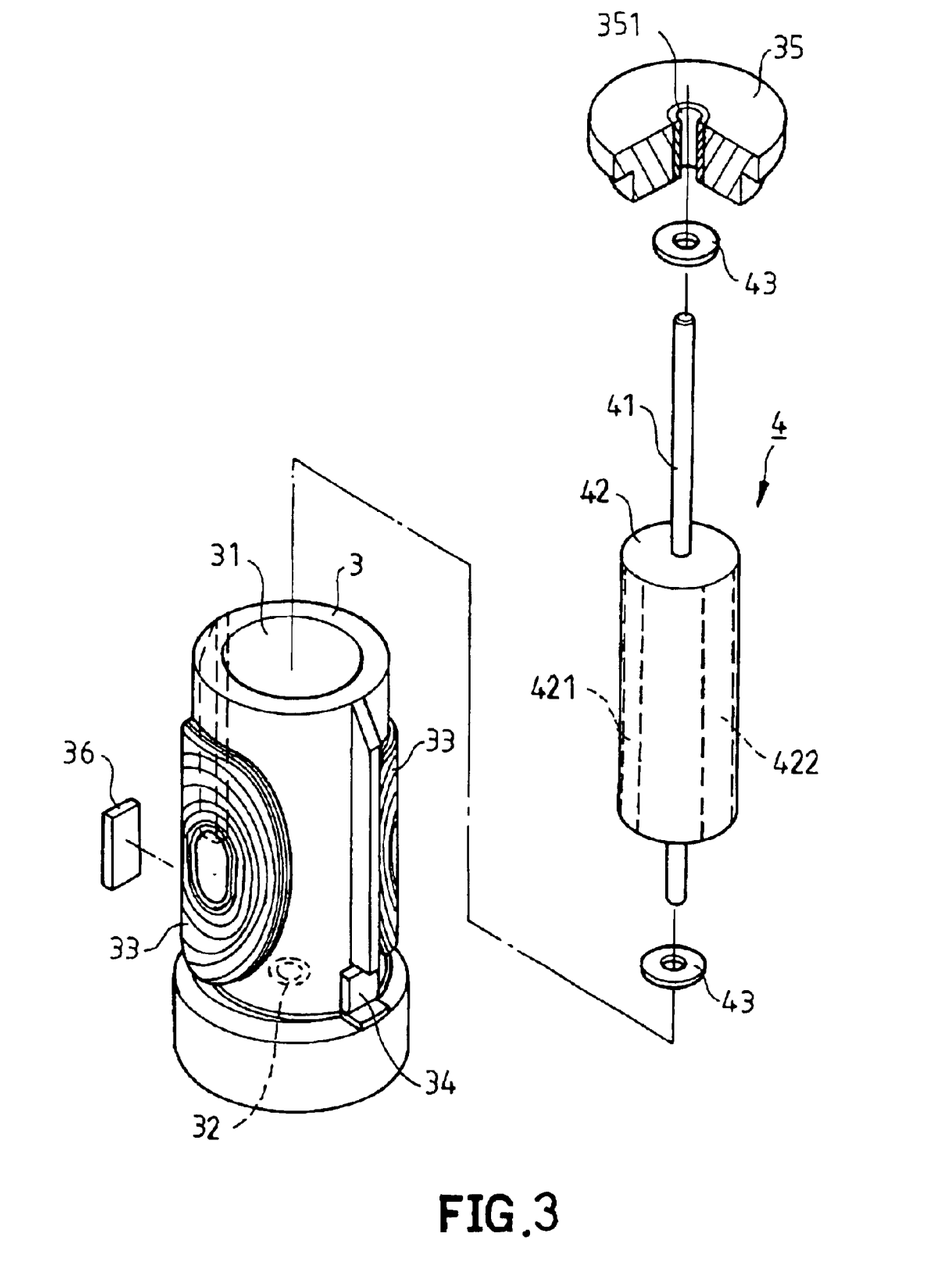
FIG. 3 is an exploded perspective view of a second embodiment of the D.C. brushless motor structure in accordance with the present invention.

FIG. 3 illustrates a second embodiment of the invention comprising a base 3 and a rotor 4.

The base 3 is a casing having a through-hole 31. A support section 32 is provided in an end of the through-hole 31. The support section 32 may be a bearing or shaft sleeve for rotatably holding a shaft 41 of the rotor 4. Even-numbered windings 33 are securely mounted to an outer wall of the base 3 or an inner wall defining the through-hole 31. An IC control means 34 comprising a conventional drive circuit and a Hall element is mounted on the base 3. The IC control means 34 is located between two adjacent windings 33 and electrically connected to the windings 33. In order to allow stable rotation of the rotor 4, a support element 35 is mounted on the other end of the base 3 and has a support section 351 in the form of a bearing or shaft sleeve. Of more importance, at least one positioning member 36 made of magnetically attractive metal is mounted to the base 3. The positioning member 36 can be of any shape, such as a disc, cube, or plate. The positioning member 36 is positioned between two windings 33.

The shaft 41 of the rotor 4 is rotatably held by the support section 32 of the base 3 and the support section 351 of the support element 35. A permanent ring magnet 42 is mounted to the shaft 41 of the rotor 4 and comprises north and south poles. If necessary, a washer 43 made of abrasion-resistant material may be mounted around the shaft 41 and located between the permanent ring magnet 42 and the support section 32 of the base 3, and another washer 43 made of abrasion-resistant material may be mounted around the shaft 41 and located between the permanent ring magnet 42 and the support section 351 of the support element 35. The permanent ring magnet 42 comprises at least two transition areas 421, each transition area 421 having a first end contiguous to a north pole and a second end contiguous to a south pole. Each of the north and south poles has a strong magnetic area 422 located in an intermediate position between two transition areas 421.

Figure 4:
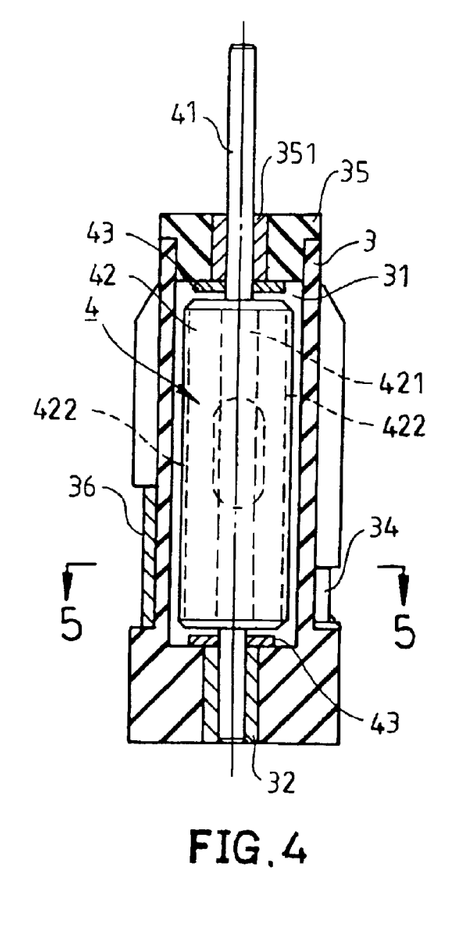
FIG. 4 is a sectional view of the D.C. brushless motor structure in FIG. 3.
Figure 5:
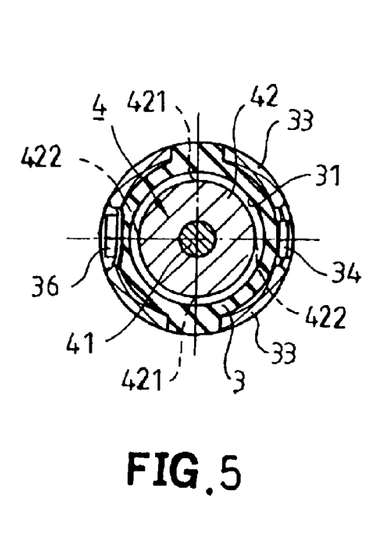
FIG. 5 is a sectional view taken along line 5—5 in FIG. 4.

As illustrated in FIGS. 4 and 5, the base 3 has even-numbered windings 33 mounted to the outer wall thereof. The rotor 4 is received in the through-hole 31 of the base 3. Two ends of the shaft 41 of the rotor 4 are respectively, rotatably received in the support section 32 of the base 3 and the support section 351 of the support element 35. And the permanent ring magnet 42 of the rotor 4 is located in a position relative to the windings 33 of the base 3. The IC control means 34 detects a change in the polarities of the permanent ring magnet 42 of the rotor 4 and sends a signal to alter the polarities of the magnetic fields created by the windings 33, thereby driving the permanent ring magnet 22 to turn by repulsive forces. When the rotor 4 stops, one of the strong magnetic areas 422 of the north and south poles of the permanent ring magnet 42 is attracted and thus retained in place by the magnetically attractive positioning member 36 on the base 3. Thus, the strong magnetic area 422 of each magnetic pole of the permanent ring magnet 42 is located away from a respective winding 33 on the base 3. Namely, the transition areas 421 of the permanent ring magnet 42 are not proximal to and thus not face the IC control means 34. As a result, when the rotor 4 is to be restarted, the IC control means 34 will surely be able to detect the polarities of the permanent ring magnet 42 and thus reliably restart the motor easily.

Figure 6:
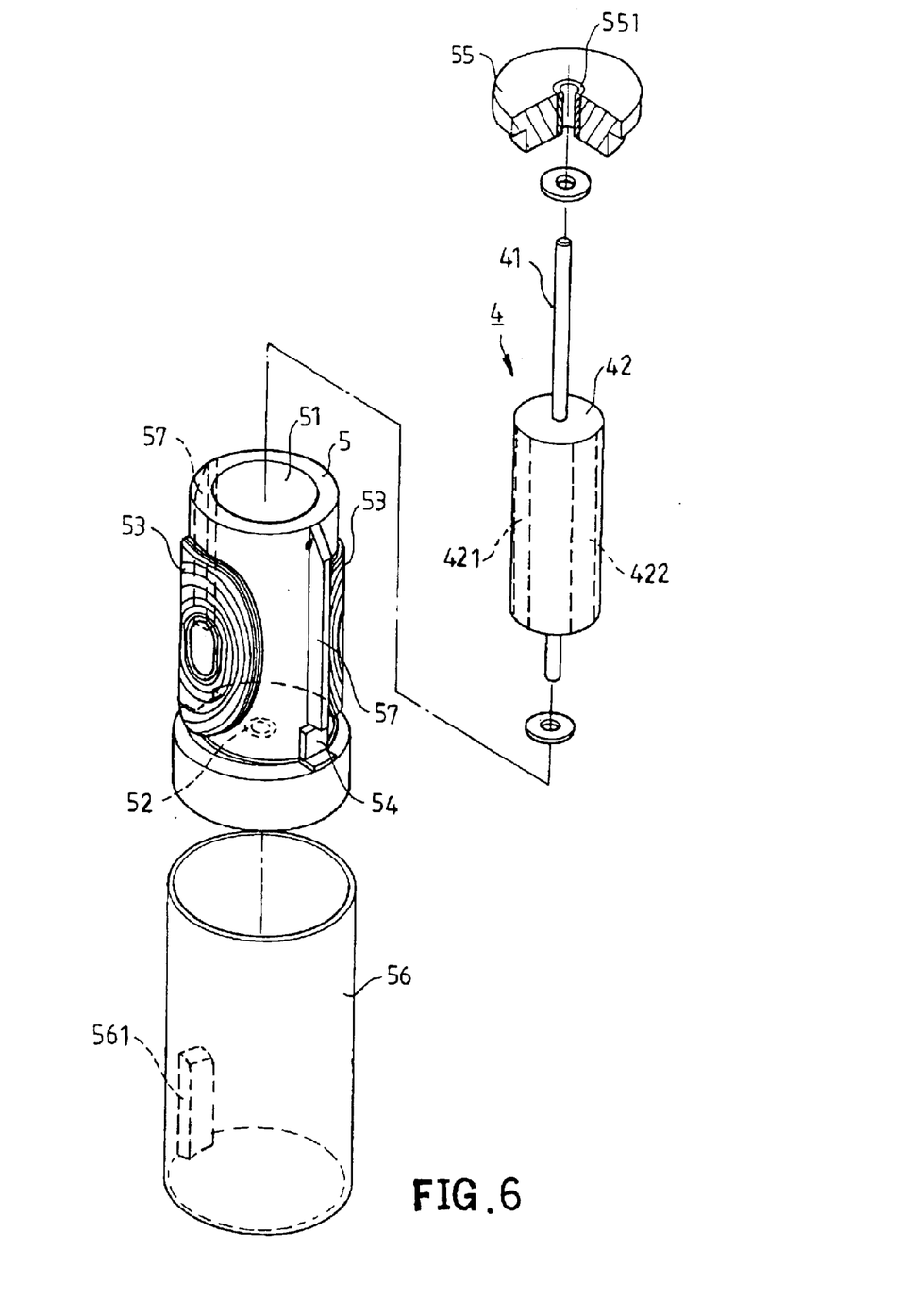
FIG. 6 is an exploded perspective view of a third embodiment of the D.C. brushless motor structure in accordance with the present invention.

FIG. 6 illustrates a third embodiment of the invention comprising a base 5 and a rotor 4.

The base 5 is a casing having a through-hole 51. A support section 52 is provided in an end of the through-hole 51. The support section 52 may be a bearing or shaft sleeve for rotatably holding a shaft 41 of the rotor 4. Even-numbered windings 53 are securely mounted to an outer wall of the base 5 or an inner wall defining the through-hole 51. An IC control means 54 comprising a conventional drive circuit and a Hall element is mounted on the base 5. The IC control means 54 is located between two adjacent windings 53 on the base 5 and electrically connected to the windings 53. In order to allow stable rotation of the rotor 4, at least one rib 57 is formed on the outer wall of the base 5 to prevent damage to the windings 53 or the IC control means 54 when a casing 56 is tightly fitted around the base 5. The casing 56 mounted around the base 5 has an end beyond the base 5, and a support element 55 is mounted to the end of the casing 56. The support element 55 has a support section 551 in the form of a bearing or shaft sleeve. At least one positioning member 561 made of magnetically attractive metal is provided on the casing 56 and can be of any shape, such as a disc, cube, or plate. The positioning member 561 is positioned between two windings 53. In a preferred embodiment, the casing 56 is made of magnetically attractive metal, and the positioning member 561 is directly formed on an inner periphery of the casing 56 by means of pressing. Thus, the positioning element 561 is more proximal to the permanent ring magnet 42 of the rotor 4 than the inner periphery of the casing 56 is.

The shaft 41 of the rotor 4 is rotatably held by the support section 52 of the base 5 and the support section 551 of the support element 55. The permanent ring magnet 42 is mounted to the shaft 41 of the rotor 4 and comprises north and south poles. The permanent ring magnet 42 comprises at least two transition areas 421, each transition area 421 having a first end contiguous to a north pole and a second end contiguous to a south pole. Each of the north and south poles has a strong magnetic area 422 located in an intermediate position between two transition areas 421.

Figure 7:
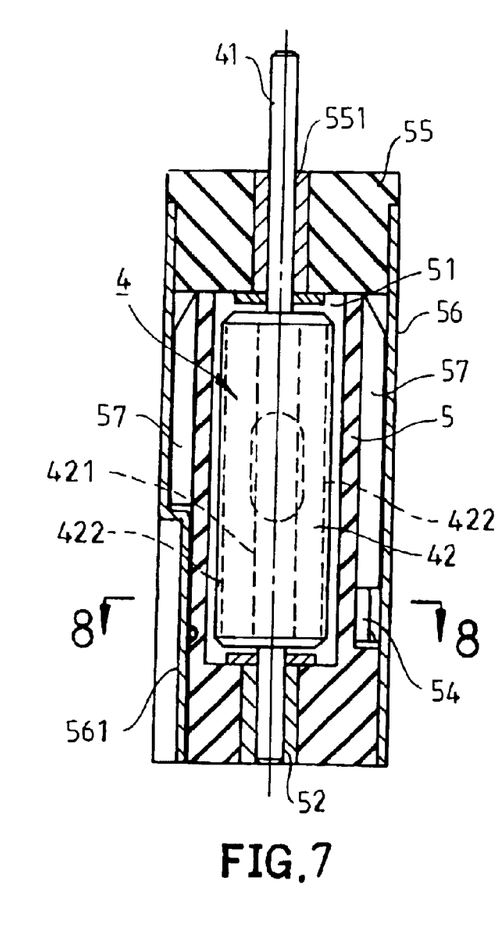
FIG. 7 is a sectional view of the D.C. brushless motor structure in FIG. 6.
Figure 8:
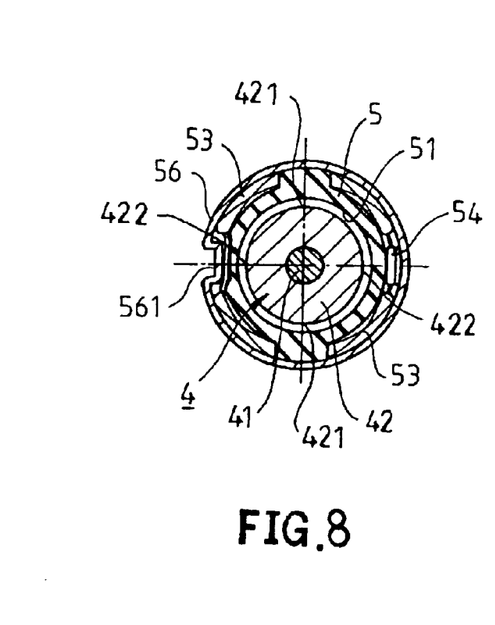
FIG. 8 is a sectional view taken along line 8—8 in FIG. 7.

As illustrated in FIGS. 7 and 8, the base 5 has even-numbered windings 53 mounted to the outer wall thereof The rotor 4 is received in the through-hole 51 of the base 5. Two ends of the shaft 41 of the rotor 4 are respectively, rotatably received in the support section 52 of the base 5 and the support section 551 of the support element 55. And the permanent ring magnet 42 of the rotor 4 is located in a position relative to the windings 53 of the base 5. The IC control means 54 detects a change in the polarities of the permanent ring magnet 42 of the rotor 4 and sends a signal to alter the polarities of the magnetic fields created by the windings 53, thereby driving the permanent ring magnet 42 to turn by repulsive forces. When the rotor 4 stops, one of the strong magnetic areas 422 of the north and south poles of the permanent ring magnet 42 is attracted and thus retained in place by the magnetically attractive positioning member 561 on the casing 56. Thus, the strong magnetic area 422 of each magnetic pole of the permanent ring magnet 42 is located away from a respective winding 53 on the base 5. Namely, the transition areas 421 of the permanent ring magnet 42 are not proximal to and thus not face the IC control means 54. As a result, when the rotor 4 is to be restarted, the IC control means 54 will surely be able to detect the polarities of the permanent ring magnet 42 and thus reliably restart the motor easily.

The easy-to-start D.C. brushless motor structure in accordance with the present invention provides a magnetically attractive positioning member between any two of the windings as well as an IC control means that is capable of detecting the polarities of the permanent ring magnet of the rotor, such that when the rotor stops, one of the strong magnetic areas of the permanent ring magnet of the rotor is attracted by the magnetically attractive positioning member and thus retained in a place not facing the IC control means. Thus, it is impossible for the transition areas of the permanent ring magnet to be located in a position proximal to the IC control means. As a result, when restarting is required, the IC control means will always be capable of detecting the polarities of the permanent ring magnet of the rotor and thus allow the rotor to be restarted easily.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. An easy-to-start structure for a D.C. brushless motor, comprising:
 a base comprising a through-hole having an end, a support section being provided in the end of the through-hole, plural windings and an IC control means being mounted to the base, at least one positioning member being mounted to the base and located within a space defined between said plural windings; and
 a rotor comprising a shaft and a permanent ring magnet having a north pole and a south pole, each of the south pole and the north pole having a strong magnetic area, said positioning member being arranged to be directly aligned with whichever of the strong magnetic areas is closest to the positioning member when the rotor stops, and the shaft being rotatably held by the support section;
 said at least one positioning member being made of a material capable of attracting said whichever of the strong magnetic areas is closest and thus retaining one of the strong magnetic areas of the permanent ring magnet in a predetermined angular position proximal to said at least one positioning member when the rotor stops.

2. The easy-to-start structure for a D.C. brushless motor as claimed in claim 1, further comprising a support element mounted to another end of the through-hole, the support element comprising a second support section for rotatably holding an end of the shaft of the rotor.

3. The easy-to-start structure for a D.C. brushless motor as claimed in claim 1, wherein the base has at least one positioning groove for receiving said at least one positioning member.

4. The easy-to-start structure for a D.C. brushless motor as claimed in claim 1, wherein the IC control means is located between two of said plural windings that are adjacent to each other.

5. The easy-to-start structure for a D.C. brushless motor as claimed in claim 1, wherein the rotor has blades mounted thereon.

6. The easy-to-start structure for a D.C. brushless motor as claimed in claim 2, wherein the base comprises at least one engaging hole, and wherein the support element comprises at least one engaging piece for engaging with said at least one engaging hole.

7. An easy-to-start structure for a D.C. brushless motor, comprising:
 a base comprising a through-hole having an end, a support section being provided in the end of the through-hole, plural windings and an IC control means being mounted to the base;
 a rotor comprising a shaft and a permanent ring magnet having a north pole and a south pole, each of the south pole and the north pole having a strong magnetic area, the shaft being rotatably held by the support section; and a casing mounted around the base, the casing comprising at least one positioning member provided thereon, said at least one positioning member being located within a space defined between said plural windings, said positioning member being arranged to be directly aligned with whichever of the strong magnetic areas is closest to the positioning member when the rotor stops;

said at least one positioning member being made of a material capable of attracting and thus retaining said whichever of the strong magnetic areas is closest and thus retaining one of the strong magnetic areas of the permanent ring magnet in a predetermined angular position proximal to said at least one positioning member when the rotor stops.

8. The easy-to-start structure for a D.C. brushless motor as claimed in claim 7, wherein the base further comprises at least one rib on an outer wall thereof, and wherein the casing is tightly fitted to said at least one rib.

9. The easy-to-start structure for a D.C. brushless motor as claimed in claim 7, wherein said at least one positioning member is directly formed on the casing by means of pressing.

10. The easy-to-start structure for a D.C. brushless motor as claimed in claim 7, further comprising a support element mounted to another end of the through-hole, the support element comprising a second support section for rotatably holding an end of the shaft of the rotor.

11. The easy-to-start structure for a D.C. brushless motor as claimed in claim 7, wherein the IC control means is located between two of said plural windings that are adjacent to each other.

12. The easy-to-start structure for a D.C. brushless motor as claimed in claim 10, wherein the base comprises at least one engaging hole, and wherein the support element comprises at least one engaging piece for engaging with said at least one engaging hole.

13. An easy-to-start structure for a D.C. brushless motor, comprising:

a base including plural windings, an IC control means being mounted to the base, and at least one thin positioning member located within a space defined between any two of said plural windings;

a rotor including a shaft and a permanent ring magnet having a north pole and a south pole, each of the south pole and the north pole having a relatively strong magnetic area aligned with said positioning member, said positioning member being arranged to be directly aligned with whichever of the strong magnetic areas is closest to the positioning member when the rotor stops;

said at least one positioning member being made of a material capable of attracting and thus retaining one of the relatively strong magnetic areas of the permanent ring magnet at a precise angular position proximal to said at least one positioning member when the rotor stops.

14. The easy-to-start structure for a DC brushless motor as claimed in claim 13, wherein the relatively strong magnetic area is radially aligned with said positioning member.

* * * * *